United States Patent
Gagnier

(10) Patent No.: US 9,216,695 B2
(45) Date of Patent: Dec. 22, 2015

(54) SMALL STORAGE POCKETS FOR A VEHICLE SEAT ASSEMBLY

(71) Applicant: Ford Global Technologies, LLC, Dearborn, MI (US)

(72) Inventor: Todd Gagnier, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 13/958,689

(22) Filed: Aug. 5, 2013

(65) Prior Publication Data

US 2015/0035325 A1 Feb. 5, 2015

(51) Int. Cl.
*B60R 7/04* (2006.01)
*B60N 2/58* (2006.01)
*B60N 2/02* (2006.01)

(52) U.S. Cl.
CPC . *B60R 7/043* (2013.01); *B60N 2/58* (2013.01); *B60N 2002/0264* (2013.01)

(58) Field of Classification Search
USPC .................................. 297/188.01, 188.04
See application file for complete search history.

(56) References Cited

U.S. PATENT DOCUMENTS

| | | | | |
|---|---|---|---|---|
| 3,479,084 A | * | 11/1969 | Van Ryn | 297/162 |
| 4,331,335 A | * | 5/1982 | Starkweather | 273/348.3 |
| 5,383,727 A | * | 1/1995 | Rife | 383/11 |
| 5,713,627 A | * | 2/1998 | De Filippo | 297/188.04 |
| 7,438,356 B2 | * | 10/2008 | Howman et al. | 297/180.11 |
| 8,388,056 B2 | * | 3/2013 | Smith et al. | 297/180.12 |
| 8,625,835 B2 | * | 1/2014 | Gotlieb | 381/380 |
| 8,674,211 B1 | * | 3/2014 | Palmer et al. | 136/251 |
| 8,714,643 B2 | * | 5/2014 | Obolewicz et al. | 297/216.2 |
| 8,721,700 B2 | * | 5/2014 | Stuffel | 607/111 |
| 8,878,393 B2 | * | 11/2014 | Kirby et al. | 307/104 |
| 2010/0102601 A1 | | 4/2010 | Yasuda et al. | |
| 2012/0043789 A1 | * | 2/2012 | Lee | 297/188.06 |
| 2012/0161481 A1 | * | 6/2012 | Tache et al. | 297/217.3 |

FOREIGN PATENT DOCUMENTS

| | | |
|---|---|---|
| JP | 09058358 A | 3/1997 |
| JP | 09109779 A | 4/1997 |
| JP | 2003072471 A | 3/2003 |
| JP | 2005152513 A | 6/2005 |

OTHER PUBLICATIONS

Varela, Kristin, "2013 Subaru Legacy," cars.com, Oct. 31, 2012 (3 pages).

* cited by examiner

*Primary Examiner* — Sarah B McPartlin
(74) *Attorney, Agent, or Firm* — Vichit Chea; Price Heneveld LLP

(57) ABSTRACT

A vehicle seat assembly includes a seat portion disposed adjacent to a seat back having a front surface, a back surface, an inboard surface, and an outboard surface. A side pocket extends across the inboard surface and terminates at a forward edge proximate the front surface at a first end and terminates at a rearward edge proximate the back surface at a second end. An upper back pocket disposed is on an upper back surface of the seat back and a lower back pocket disposed on a lower back surface of the seat back.

17 Claims, 4 Drawing Sheets

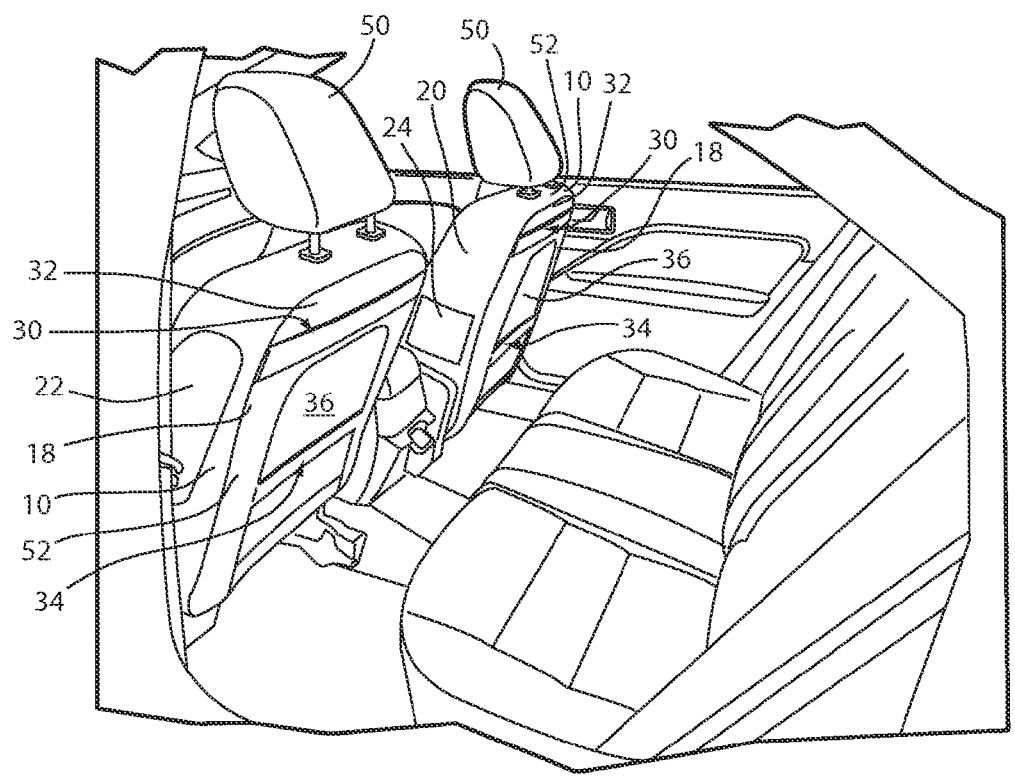
FIG. 3
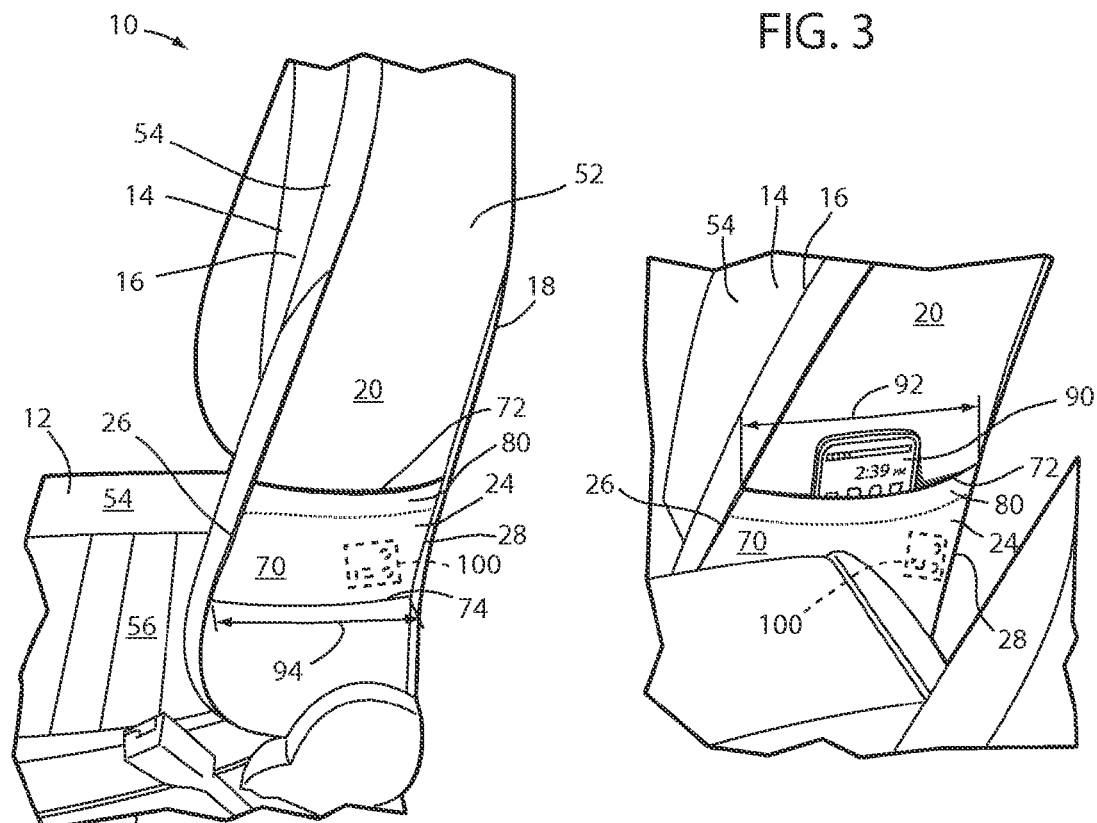
FIG. 4A
FIG. 4B

SMALL STORAGE POCKETS FOR A VEHICLE SEAT ASSEMBLY

FIELD OF THE INVENTION

The present invention generally relates to a vehicle seat assembly, and more particularly to small storage pockets in a vehicle seat assembly.

BACKGROUND OF THE INVENTION

Vehicles that include improved storage technology increase value and convenience to a consumer.

SUMMARY OF THE INVENTION

According to one aspect of the present invention, a vehicle seat assembly includes a seat portion disposed adjacent to a seat back having a front surface, a back surface, an inboard surface, and an outboard surface. A side pocket extends across the inboard surface and terminates at a forward edge proximate the front surface at a first end and terminates at a rearward edge proximate the back surface at a second end. An upper back pocket disposed is on an upper back surface of the seat back and a lower back pocket disposed on a lower back surface of the seat back.

According to another aspect of the present invention, a vehicle seat assembly includes a seat back having a headrest disposed thereon. A pocket is disposed on at least one of an inboard surface of the seat back, a top back surface proximate the headrest, and a lower back surface. The pocket includes a first compartment and a second compartment disposed within the first compartment. An electronic charging module is disposed inside an interior space of the pocket.

According to yet another aspect of the present invention, a vehicle seat includes a seat portion disposed adjacent to a seat back. The seat back includes an inboard surface. A pocket is disposed on the inboard surface. First and second pockets are disposed on a rear side of the seat back. At least one of the first and second pockets includes a main compartment and an inner compartment disposed within the main compartment.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a fragmentary side rear perspective view of the interior of the vehicle of FIG. 1 according to one embodiment of the present invention;

FIG. 4A is a fragmentary side perspective view of a vehicle seat according to one embodiment of the present invention;

FIG. 4B is a fragmentary side perspective view of the vehicle seat according to the embodiment shown in FIG. 4A including an electronic device;

DETAILED DESCRIPTION OF THE EMBODIMENTS

Figure 1:
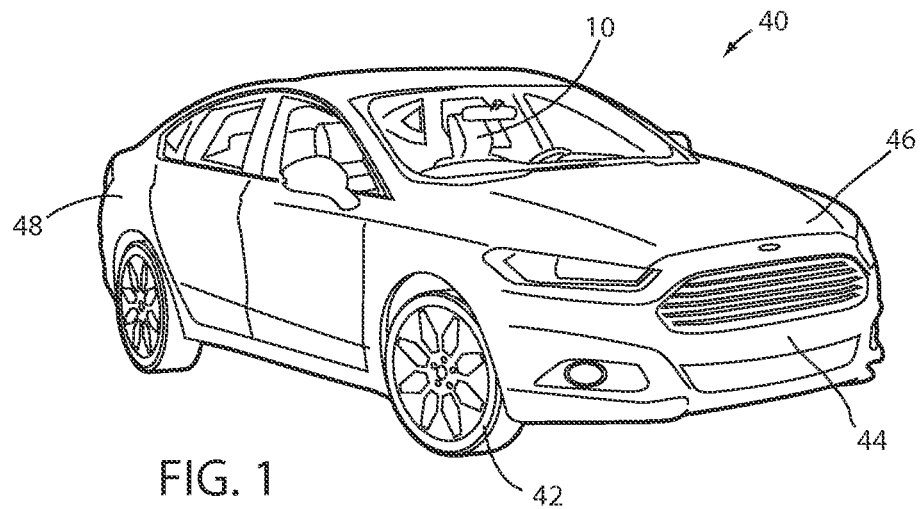
FIG. 1 is a front perspective view of a vehicle having a vehicle seat according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-8, reference numeral 10 generally designates a vehicle seat assembly including a seat portion 12 and a seat back portion 14 which includes a front surface 16, a back surface 18, an inboard surface 20, and an outboard surface 22. As best shown in FIG. 4A, side pocket 24 extends across the inboard surface 20 of the vehicle seat back 14, and terminates at a forward side edge 26 proximate the front surface 16 of the seat back 14, and further terminates at a rearward side edge 28 proximate the back surface 18 of the vehicle seat back 14. As best shown in FIG. 3, an upper back pocket 30 is disposed on an upper back surface 32 of the seat back 14 and a lower back pocket 34 is disposed on a lower back surface 36 of the seat back 14.

Referring specifically to FIG. 1, a vehicle 40 includes the vehicle seat assembly 10 and also includes standard features such as multiple wheels 42, a front bumper 44, a front end 46, and a rear end 48. The vehicle 40 may be of any type including a compact vehicle, a mid-size vehicle, a sport utility vehicle, a mini or full size van, or any type of truck.

Figure 2:
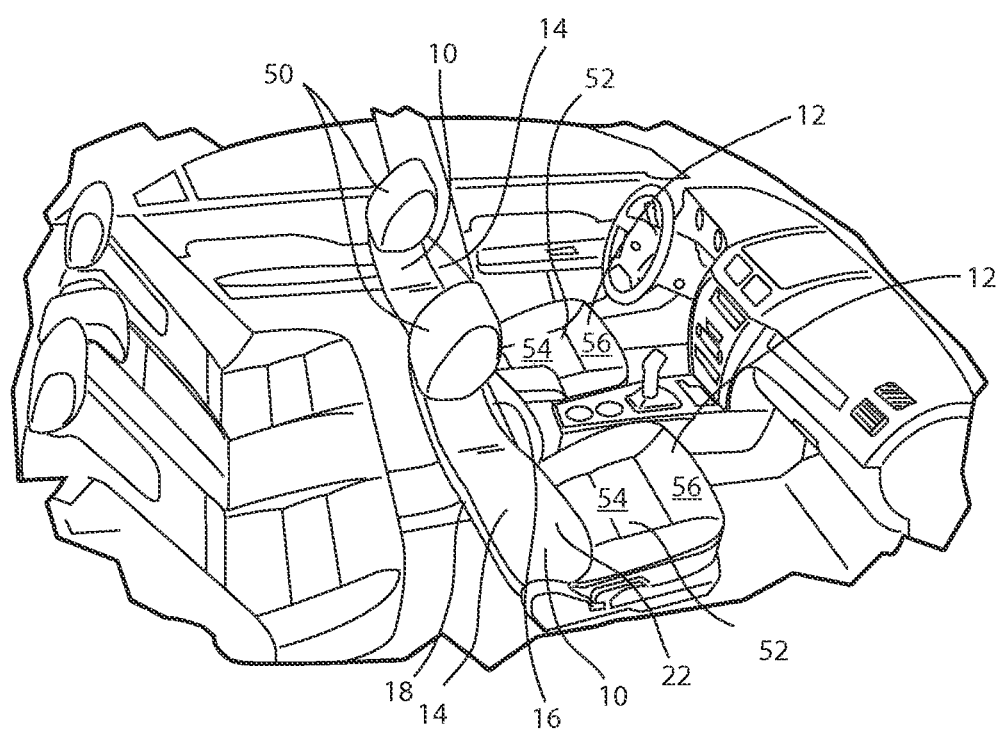
FIG. 2 is a fragmentary side perspective view of an interior of the vehicle of FIG. 1 according to one embodiment of the present invention.

As illustrated in the embodiment shown in FIG. 2, the vehicle seat assembly 10 includes the seat portion 12 and the seat back portion 14 along with a headrest 50 disposed thereon. As noted above, the seat back 14 includes the front surface 16, the back surface 18, the inboard surface 20, and the outboard surface 22. The vehicle seat assembly 10 also includes a cover stock or skin assembly 52 which is completely disposed over the seat back 14 and the seat portion 12, and may include a variety of materials known in the art. In assembly, the cover stock 52 also provides a passenger engagement surface 54 on the front surface 16 of the seat back 14 and on a top surface 56 of the seat portion 12.

Figure 5:
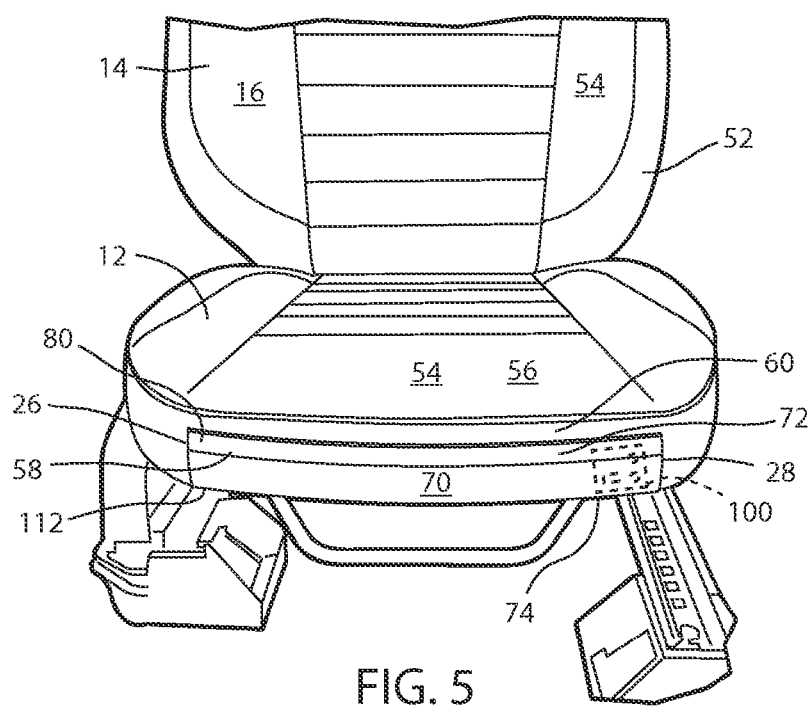
FIG. 5 is a fragmentary front plan view of a vehicle seat according to another embodiment of the present invention.

Referring now to the embodiment shown in FIG. 3, integral pockets 24, 30, 34 may be disposed on the inboard surface 20 of the seat back 14, the upper back surface 32 of the seat back 14, the lower back surface 36 of the seat back 14, or any combination thereof. Additionally, an integral front pocket 58 may be disposed on a forward surface 60 of the seat portion 12 as shown in FIG. 5. In accordance with the present invention, any of the integral pockets 24, 30, 34, 58 described above may include a hidden inner pocket 62 disposed inside of or otherwise within the integral pockets 24, 30, 34, 58 as further described below.

Referring now to the embodiment shown in FIGS. 4A and 4B, the side pocket 24 extends across the inboard surface 20 of the seat back 14. The side pocket 24 includes a front face 70 having a top edge 72, a bottom edge 74, and a forward side edge 26 along with a rearward edge 28 to collectively define a perimeter of the side pocket 24. The side pocket 24 extends across the entirety of inboard surface 20, such that the forward side edge 26 is disposed proximate the front surface 16 of the seat back 14 and the rearward edge 28 is disposed proximate the back surface 18 of the seat back 14. As shown in the embodiment of FIG. 4A, the top edge 72 of the side pocket 24 begins approximately two-thirds of the way down the inboard surface 20 of the seat back 14. More specifically, the top edge 72 of the side pocket 24 begins approximately at a height of an elbow of a vehicle passenger when the vehicle passenger is seated on the vehicle seat assembly 10, thereby allowing easy and quick access to the side pocket 24. The forward side edge 26, the reward side edge 28, and the bottom edge 74 are integrally disposed on the inboard surface 20 of the seat back 14. Specifically, the rearward side edge 28, forward side edge 26, and bottom edge 74 are generally sewn into the cover stock 52 of the vehicle seat assembly 10. The side pocket 24 is generally made of the same material as the cover stock 52 in order to give the vehicle seat assembly 10 a uniform look and feel. However, various materials can be used as dictated by design. In assembly, the top edge 72 of the side pocket 24 is not attached to the inboard surface 20, such that the top edge 72 is adapted to allow access to an interior of the side pocket 24.

Referring again to the embodiment shown in FIGS. 4A and 4B, the top edge 72 of the side pocket 24 may also include a reinforced section 80 which is made of multiple layers of fabric or other like reinforcement, such that the top edge 72 is rigidified to withstand the rigors of everyday use without fraying or ripping. As illustrated in the embodiment shown in FIG. 4A, the reinforced section 80 of the top edge 72 may extend slightly downward onto the front surface 70 of the side pocket 24, approximately 20-30 millimeters, and more specifically, about 25 millimeters. Additionally, the inboard surface 20 of the seat back 14 may be an angled surface, such that the top edge 72 of the side pocket 24 has a shorter length than the bottom edge 74 of the side pocket 24 while the side pocket 24 still extends across the entirety of the inboard surface 20.

Referring now to the embodiment shown in FIG. 4B, the side pocket 24 is configured to receive an electronic device 90, such as a portable electronic device. Specifically, the top edge 72 of the side pocket 24 has a length 92 of approximately 85 to 105 millimeters, and more specifically, about 95 millimeters. Moreover, the bottom edge 74 of the side pocket 24 has a length 94 of approximately 100 to 130 millimeters, and specifically, approximately 115 millimeters. However, it is contemplated that the lengths 92, 94 of the top edge 72 and the bottom edge 74 may be varied based upon the type of vehicle in which the vehicle seat assembly 10 is disposed.

The side pocket 24 may include a module 100 configured to provide a variety of electronic features to the side pocket 24 and to various electronic devices 90 stored in the side pocket 24. First, the module 100 may be configured to provide a charging port to the electronic device 90. Charging of the electronic device 90 may be activated when the electronic device 90 is disposed inside of an interior of the side pocket 24, or when the electronic device 90 comes within a certain range of the side pocket 24. The charging mechanism may be an inductive charging assembly or may be a hard-wired charging assembly. The module 100 may also include an indicator light which informs the passenger that the electronic device 90 is charging or fully charged. Additionally, the indicator light can blink or otherwise alert the passenger that the electronic device 90 is still disposed in the side pocket 24 when the passenger turns off or exits the vehicle.

Referring again to the embodiment shown in FIGS. 4A and 4B, the module 100 may include a climate control assembly. It is contemplated that the climate control assembly is configured to provide heating or cooling to the side pocket 24. The climate control assembly may include a fan configured to provide air flow to the side pocket 24. Moreover, the climate control assembly may be operably coupled to a climate control interface of the vehicle 40 in order to match the temperature of the side pocket 24 to the temperature inside of the vehicle 40 as controlled by vehicle passengers. Additionally, the climate control assembly may be independent of a climate control interface of the vehicle 40, such that even when the vehicle 40 is off, the side pocket 24 is configured to maintain a desired temperature as set by the passenger.

Moreover, the module 100 may include a light source. The light source may be configured to illuminate the interior of the side pocket 24. The light source may also be disposed on the front surface 70 of the side pocket 24 in order to provide ambient lighting features. In addition, the light source may be an automatic light source, such that when the side pocket 24 is opened, the light source illuminates and when the side pocket 24 is closed, the light source is turned off. Additionally, the module 100 may include a line operably coupled with a speaker which is configured to couple with the electronic device 90. The speaker may be an additional speaker to a sound system of a vehicle and further be configured to sync with the vehicle sound system. The speaker may also be specifically configured to work with the electronic device 90 that is disposed in the side pocket 24. It is contemplated that the speaker may project sound from the electronic device 90. For example, if the electronic device 90 is a cell phone, and the cell phone receives a phone call, the speaker may amplify the sound of the ringing cell phone, such that a vehicle passenger is notified that the cell phone is ringing. Moreover, it is contemplated that the speaker may be configured to project sound from a video, a game, or other application of the electronic device 90.

Referring again to the embodiment shown in FIGS. 4A and 4B, the module 100 disposed in the side pocket 24, may also include Bluetooth capability such that when the electronic device 90 is disposed inside the side pocket 24, the electronic device 90 is able to connect to the vehicle 40 through a Bluetooth connection. It is contemplated that the Bluetooth system may allow incoming and outgoing calls to be made, music to be played, along with voice activation and various other features to be activated through the vehicle 40 while allowing the passenger to remain hands-free and the electronic device 90 to remain inside the side pocket 24. Additionally, the side pocket 24 may include a magnetic portion disposed on a top portion 102 of the side pocket 24 in order to provide a closure mechanism for the side pocket 24. It is also contemplated that the magnetic portion may be disposed along a bottom portion 104 of the side pocket 24 in order to provide easy access to paper clips, loose change, or other magnetic objects.

Referring now to the embodiment shown in FIG. 5, the front pocket 58 may be disposed on the seat portion 12 which includes the top surface 56, a bottom surface 112, and the forward surface 60. As illustrated in the embodiment of FIG. 5, the front pocket 58 is disposed on the forward surface 60 of the seat portion 12. Moreover, in the embodiment of FIG. 5, the front pocket 58 is disposed over an entire length of the forward surface 60 of the seat portion 12. The front pocket 58, as shown in the embodiment in FIG. 5, may include many of the same features as described above with respect to FIGS. 4A and 4B including the reinforced top edge 72, the bottom edge 74, and the forward and rearward side edges 26, 28. Moreover, the front pocket 58, as shown in the embodiment of FIG. 5, may include the module 100 as described above with respect to FIGS. 4A and 4B. The front pocket 58 as shown in the embodiment in FIG. 5 is a more shallow pocket and generally provides storage for pens, pencils, or small electronic devices.

Figure 6:
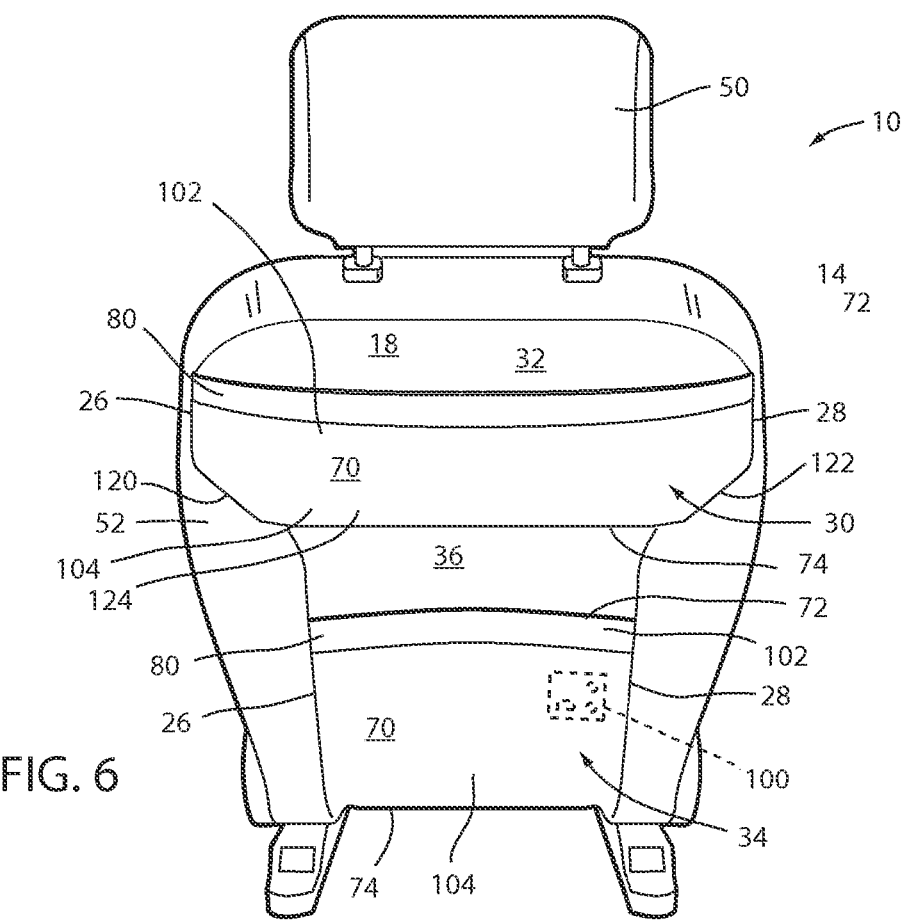
FIG. 6 is a rear plan view of the vehicle seat according to another embodiment of the present invention.

Referring now to the embodiment shown in FIG. 6, the back surface 18 of the seat back 14 may include at least one of the upper back pocket 30 and the lower back pocket 34. The upper back pocket 30 is disposed on the upper back surface 32 of the seat back 14 and generally extends along the entire width of the seat back 14. The upper back pocket 30 may include many of the same features as described above with respect to FIGS. 4A and 4B including the reinforced top edge 72, the bottom edge 74, and the forward side edge 26 and rearward side edge 28. Additionally, the upper back pocket 30 is also configured to receive the electronic device 90 and may include a module similar to the module 100 as described above with respect to FIGS. 4A and 4B. Moreover, the upper back pocket 30 may include a first angled edge 120, which connects the forward side edge 26 to the bottom edge 74, and a second angled edge 122, which connects the rearward side edge 28 to the bottom edge 74. The first and second angled edges 120, 122 give the upper back pocket 30 a generally hexagonal shape on a lower portion 124 in order to provide easy access to all parts of the upper back pocket 30. The disclosed design also helps to prevent small objects from getting lodged or wedged in deep corners of the back pocket 30 as stored therein. The upper back pocket 30 provides storage capabilities to the vehicle passenger seated on an adjacent vehicle seat assembly 10. In order to access the upper back pocket 30, the passenger reaches over the headrest 50 of the driver's-side seat assembly 10 and then accesses the upper back pocket 30 disposed just below the headrest 50 of the driver's-side seat assembly 10. The upper back pocket 30 also provides storage to a rear seat passenger who will have easy access to the upper back pocket 30 disposed directly in front of the back seat passenger. Moreover, the upper back pocket 30 is a larger pocket than the side pocket 24 and is capable of holding more substantial electronics such as a tablet device.

Referring again to the embodiment shown in FIG. 6, the back surface 18 of the seat back 14 may also include the lower back pocket 34 disposed on the lower back surface 36 of the seat back 14. The lower back pocket 34 may also include many of the same features as described above with respect to the embodiment shown in FIGS. 4A and 4B, such as the reinforced top edge 72, the bottom edge 74, the forward side edge 26, and the rearward side edge 28. Additionally, the lower back pocket 34 is also configured to receive an electronic device 90, and may further include a module 100 similar to those described above with respect to FIGS. 4A and 4B. The lower back surface 36 is generally a centrally located pocket with respect to the overall width of the lower back surface 36 of the seat back 14. The lower back pocket 34 is configured to provide additional storage and provide easy access to that storage to the rear seat vehicle passenger sitting behind the vehicle seat assembly 10. It is contemplated that the lower back pocket 34 has a larger depth than any of the previous embodiments as described above, such that the lower back pocket 34 has greater storage capacity.

Figure 7:
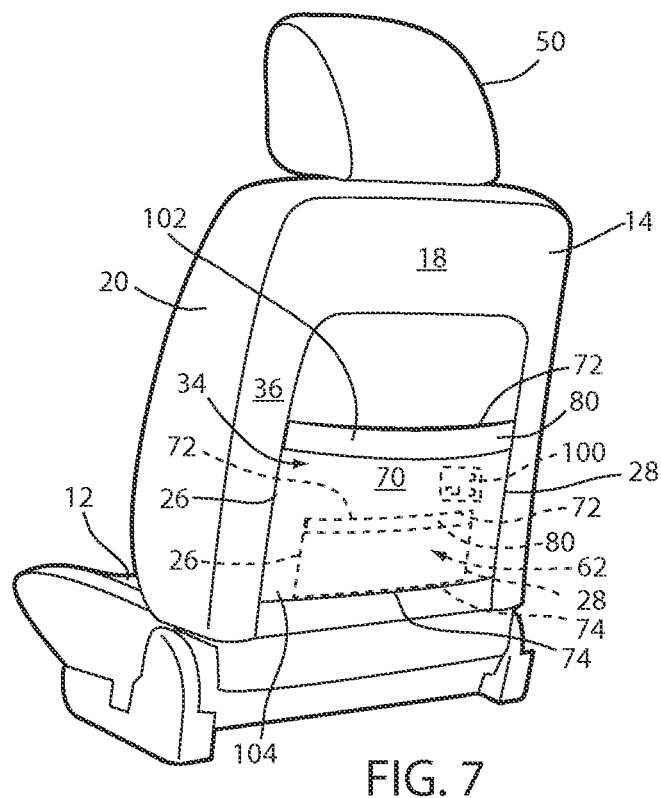
FIG. 7 is a rear perspective view of a vehicle seat according to another embodiment of the present invention.
Figure 8:
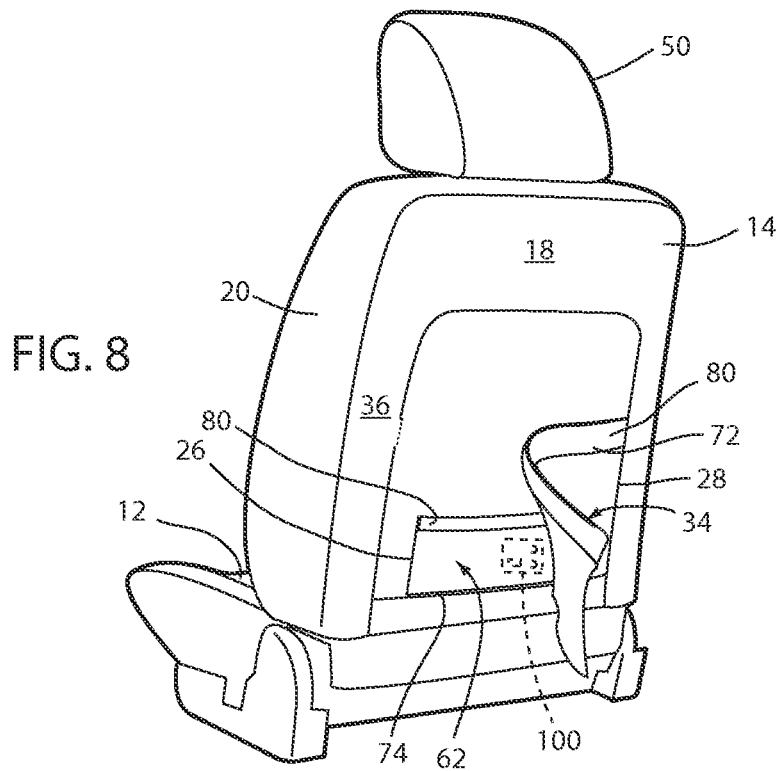
FIG. 8 is a rear perspective view of a vehicle seat according to another embodiment of the present invention.

Referring now to the embodiment shown in FIGS. 7 and 8, the lower back pocket 34 may further include the hidden, inner pocket 62 disposed inside an interior of the lower back pocket 34. As illustrated in the embodiment of FIG. 7, the inner pocket 62 may be operably coupled to the lower back pocket 34 itself such that the inner pocket 62 is operably coupled to the lower back pocket 34 for movement therewith. However, it is also contemplated, as shown in the embodiment shown in FIG. 8, that the inner pocket 62 may be operably coupled to the lower back surface 36 of seat back 14, such that the lower back pocket 34 is disposed over the inner pocket 62. In both of the embodiments shown in FIGS. 7 and 8, the inner pocket 62 is disposed proximate the bottom edge 74 of the lower back pocket 34. The inner pocket 62 may also include many of the same features as described above with respect to the embodiment shown in FIGS. 4A and 4B including the top edge 72, the bottom edge 74, and the forward side edge 26 and rearward side edge 28. Additionally, the inner pocket 62 may include the module 100 as described above with respect to the embodiment shown in FIGS. 4A and 4B. Additionally, the inner pocket 62 may be equipped with a locking mechanism or other closure mechanism in order to provide a secure pocket to the passenger. The inner pocket 62, disposed within the lower back pocket 34, may also be configured to store documentation that is traditionally stored in a glove compartment, or other emergency items as the inner pocket 62 is concealed or otherwise not immediately visible. In this way, the inner pocket 62 provides added security features for items stored therein.

Yet another aspect of the present invention includes providing adequate storage space for items, such as cell phones or other electronics, in different vehicle lines. In previous vehicle assemblies, storage within the center console and other common storage spaces has been limited. Added features, such as features to hold coins or pens, can further restrict the storage area available for cell phones, tablets, and other electronic devices. The present invention provides additional storage by the way of storage pockets 24, 30, 34, 58, 62 disposed on the vehicle seat assembly 10 in non-traditional locations. These storage pockets 24, 30, 34, 58, 62 provide an alternative location for easy access by both the driver and other vehicle passengers for small items which are not easily accommodated in a center counsel, glove compartment, or other common storage areas. The present invention provides for a side pocket 24 which extends across the inboard surface 20 of the seat back 14, the upper back pocket 30 disposed on the upper back surface 32 of the seat back 14, and the lower back pocket 34 disposed on the lower back surface 36 of the seat back 14, and optionally having the a hidden inner pocket 62 disposed within any of the storage pockets 24, 30, 34, 58, 62, thereby providing concealed storage as well.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seat assembly comprising:
    a seat portion disposed adjacent to a seat back having a front surface, a back surface, an inboard surface, and an outboard surface;
    a pocket disposed on the seat back; and
    a climate control assembly disposed within the pocket and adapted to adjust the climate of an interior portion of the pocket and maintain a desired temperature when a vehicle ignition is placed in an off position.

2. The vehicle seat assembly of claim 1, further comprising:
    a charging module configured to provide power for charging an electronic device disposed within the pocket.

3. The vehicle seat assembly of claim 2, wherein the pocket further includes an inductive charging assembly.

4. The vehicle seat assembly of claim 1, wherein the pocket includes a light source disposed on an outer portion of the pocket and adapted for use as a user notification device and an ambient lighting feature.

5. The vehicle seat assembly of claim 1, further comprising;
    a speaker that is configured to couple with an electronic device, wherein the speaker is independent from a vehicle stereo system.

6. The vehicle seat assembly of claim 1, the pocket includes a magnetic portion disposed in an interior thereof.

7. A vehicle seat assembly comprising:
    a seat back having a headrest disposed thereon;
    a pocket disposed on at least one of:
        an inboard surface of the seat back extending between a forward edge proximate a front surface of the seat back and a rearward edge proximate a back surface of the seat back;
        a top back surface proximate the headrest;
        a lower back surface; and
    a light source configured to illuminate within at least one of the pockets and on a front surface of the pocket, wherein the light source alerts the passenger that an electronic device is disposed in the pocket when the vehicle ignition is turned to an off position.

8. The vehicle seat assembly of claim 7, wherein the pocket includes a climate control assembly adapted to heat and cool an interior portion of the pocket.

9. The vehicle seat assembly of claim 7, wherein the pocket includes an inductive charging assembly adapted to provide power to an electronic device.

10. The vehicle seat assembly of claim 7, wherein the light source is further adapted for use as a user notification device.

11. The vehicle seat assembly of claim 7, wherein the pocket includes a first magnetic portion disposed on a top portion of the pocket to provide a closure mechanism and a second magnetic portion disposed along a bottom portion of the pocket.

12. The vehicle seat of claim 7, further comprising:
    a locking mechanism on the pocket.

13. The vehicle seat of claim 7, further comprising:
    a fan configured to provide airflow to the pocket disposed on the seat back.

14. A vehicle seat comprising:
    a seat back;
    first and second pockets disposed on the seat back, wherein at least one of the first and second pockets includes a main compartment and an inner compartment; and
    an electronic cord operably coupled to a speaker and configured to couple with an electronic device, wherein the speaker alerts a passenger when a ignition is placed in an off position and the electronic device is in the pocket.

15. The vehicle seat of claim 14, wherein the first or second pocket includes a climate control assembly adapted to adjust the climate of an interior portion of the pocket and includes a fan configured to provide air flow to the pocket.

16. The vehicle seat of claim 14, wherein the first or second pocket includes an inductive charging assembly.

17. The vehicle seat of claim 14, wherein the first or second pocket includes a light source adapted for use as a user notification device.

* * * * *